US006296012B1

(12) United States Patent
Kilgore et al.

(10) Patent No.: US 6,296,012 B1
(45) Date of Patent: Oct. 2, 2001

(54) FUEL PRESSURE REGULATOR WITH FUEL TEMPERATURE RESPONSIVE SHAPE MEMORY CALIBRATION

(75) Inventors: Jason T. Kilgore, Newport News; Barry S. Robinson, Williamsburg, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 104 days.

(21) Appl. No.: 09/229,154

(22) Filed: Jan. 12, 1999

(51) Int. Cl.[7] .................... G05D 16/02

(52) U.S. Cl. .................... 137/468; 123/460; 123/464; 137/505.14; 137/505.42

(58) Field of Search .................... 137/468, 505.14, 137/505.42; 123/460, 463, 464

(56) References Cited

U.S. PATENT DOCUMENTS 4,778,104 * 10/1988 Fisher .................... 137/468
5,174,326 * 12/1992 Steinert et al. .................... 137/468
5,413,077 * 5/1995 Hornby et al. .................... 123/460
5,509,390 * 4/1996 Tuckey .................... 137/468

* cited by examiner

*Primary Examiner*—Stephen M. Hepperle

(57) ABSTRACT

A returnless fuel regulator includes a diaphragm assembly dividing the regulator into a control chamber for calibration purposes and a fuel chamber in communication with fuel under pressure from a supply and a fuel rail which receives fuel under regulation pressure. The regulator includes a spring-biased valve element which is opened to a greater or lesser extent by movement of the diaphragm assembly. In the diaphragm assembly, a post is spring-biased into a predetermined position relative to the diaphragm assembly to engage the valve element. The spring is formed of a shape memory alloy which elongates in response to a predetermined temperature of the fuel within the regulator to open or further open the valve element.

11 Claims, 1 Drawing Sheet

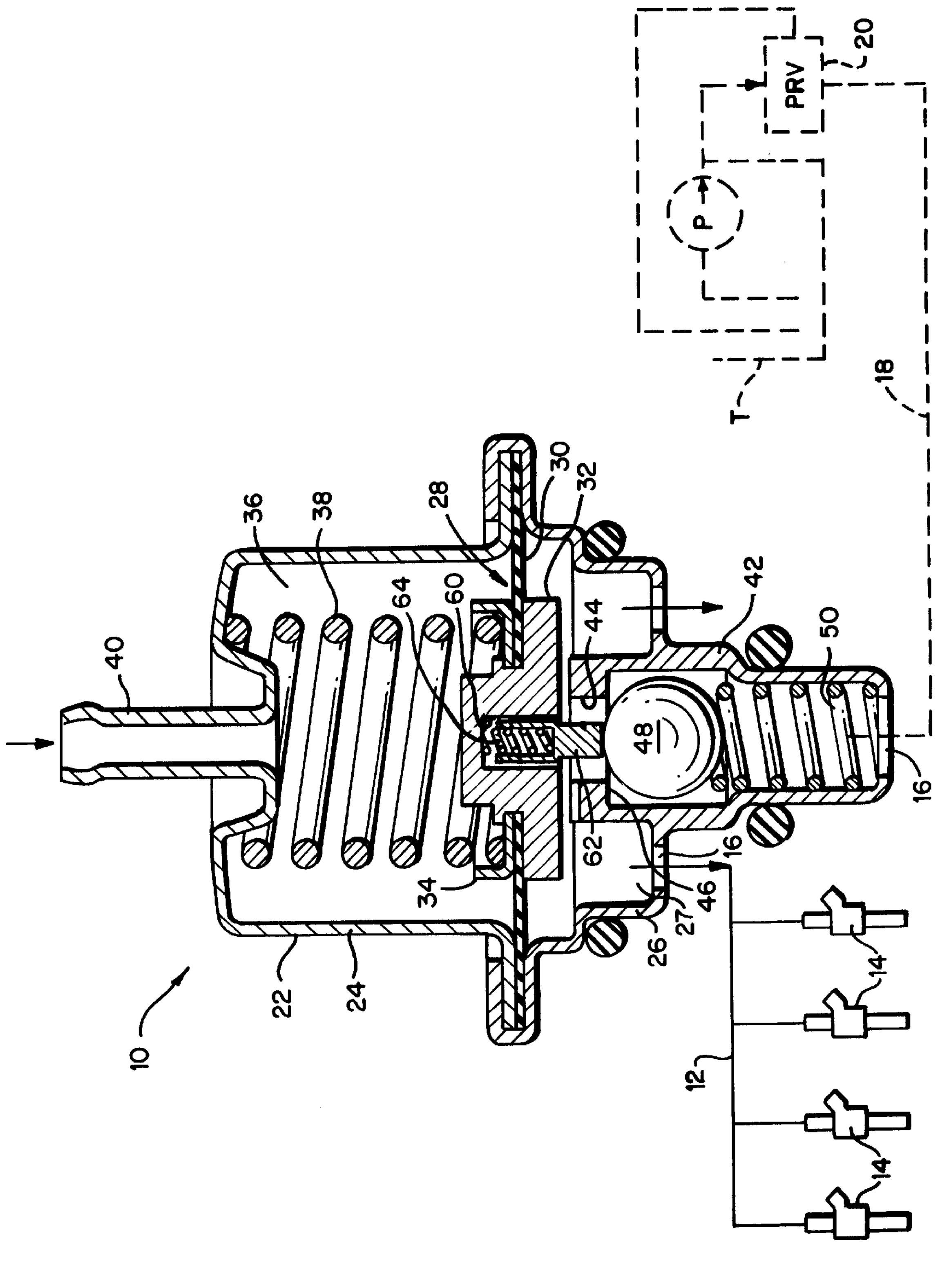
PRV
P
T
10
12
14
16
18
20
22
24
26
27
28
30
32
34
36
38
40
42
44
46
48
50
60
62
64

FUEL PRESSURE REGULATOR WITH FUEL TEMPERATURE RESPONSIVE SHAPE MEMORY CALIBRATION

TECHNICAL FIELD

The invention relates generally to a fuel system for an internal combustion engine for use, for example, in an automobile, and particularly to a fuel pressure regulator employing a shape memory device for altering the calibration pressure in response to a predetermined temperature of the fuel within the pressure regulator.

BACKGROUND OF THE INVENTION

In U.S. Pat. No. 5,413,077 of common assignee herewith, there is disclosed a returnless fuel pressure regulator which can be mounted on or adjacent the fuel rail assembly close to the fuel injectors and which regulator avoids any need for a return line to the fuel tank. The regulator disclosed in that patent also includes an intake manifold vacuum reference which essentially alters the calibration pressure of the regulator dependent upon throttle position.

A further modification of the pressure regulator illustrated in that patent is described and illustrated in U.S. patent application Ser. No. 09/056,044, filed Apr. 6, 1998 (Attorney Docket No. 98P7662). In that application, the check valve spring is formed of a shape memory alloy. The spring is responsive to a predetermined temperature to alter the fuel flow and/or pressure characteristics of the regulator and functions as a switch for providing regulated pressure or non-regulated pressure.

BRIEF SUMMARY OF THE INVENTION

In accordance with the present invention, a temperature responsive shape memory device is used in the diaphragm assembly of a returnless regulator of the type disclosed in U.S. Pat. No. 5,413,077 to alter the calibration pressure of the pressure regulator and particularly to increase the regulation pressure during a hot soak and to facilitate a hot start of the combustion engine. Particularly, the shape memory device preferably comprises a spring carried by the diaphragm assembly of the returnless regulator and engageable with a movable member, also carried by the diaphragm assembly. The member is mounted for movement with and relative to the diaphragm assembly. Particularly, the member is movable relative to the diaphragm assembly toward and away from the movable valve element of the check valve in response to a predetermined temperature of fuel within the regulator. Depending on whether the fuel temperature increases or decreases to the predetermined temperature, the member will displace the valve element away from or toward the valve seat, respectively. Preferably, the member comprises a post, which bears against the valve element throughout the range of movement of the valve element between its fully open and closed positions.

For example, when the fuel in the fuel rail and, consequently, within the pressure regulator increases in temperature during a hot soak, i.e., when the engine is off and heat concentrates in the fuel rail, it is important to prevent vaporization of the fuel within the fuel rail and hence vapor lock, which would preclude restarting of the engine. As the temperature of the fuel within the pressure regulator increases, the pressure of the fuel line causes the diaphragm to move away from the check valve, causing the valve to move toward a valve-closed position. Should the valve close, a vapor lock may occur. With the shape memory device carried by the diaphragm assembly, the shape memory device responds to a predetermined temperature and elongates to displace the post and hence the valve element in a direction opening the valve, thereby equalizing the system pressure and preventing vapor lock and the fuel rail from being over-pressurized. At temperatures above the predetermined activation temperature of the shape memory device, the member maintains the check valve in an open position enabling high pressure fuel to flow from the fuel tank to the fuel rail, thereby maintaining the fuel in liquid form and avoiding vapor lock in the fuel rail whereby a hot restart of the engine can be accomplished.

The temperature responsive shape memory device in effect causes a change in the calibration pressure of the pressure regulator. That is, the calibration pressure is set by a calibration spring within the control chamber of the regulator housing. The shape memory device, however, when actuated at a predetermined fuel temperature, increases the calibration pressure. This tends to maintain the fuel in the fuel rail in liquid form at system pressure and avoids the hot restart problem by preventing vapor lock and over-pressurization of the fuel in the fuel rail.

In a preferred embodiment according to the present invention, there is provided a fuel pressure regulator comprising a housing, a movable diaphragm dividing the housing into a fuel chamber and a control chamber, the housing having a fuel inlet port for flowing pressurized fuel toward the fuel chamber and a fuel outlet port for flowing pressure regulated fuel from the housing, a valve between the fuel inlet port and the fuel outlet port and including a valve seat, a valve element movable toward and away from the valve seat and a spring for biasing the valve element toward the valve seat, the diaphragm including a member movable with and relative to the diaphragm toward and away from the valve element and a device carried by the diaphragm engaging the member and formed of a temperature responsive shape memory material for displacing the valve element relative to the seat in response to a predetermined temperature of the fuel within the pressure regulator.

In a further preferred embodiment according to the present invention, there is provided a fuel pressure regulator comprising a housing, a movable diaphragm dividing the housing into a fuel chamber and a control chamber, the housing having a fuel inlet port for flowing pressurized fuel toward the fuel chamber and a fuel outlet port for flowing pressure regulated fuel from the housing, a valve between the fuel inlet port and the fuel outlet port and including a valve seat, a valve element movable toward and away from the valve seat and a spring for biasing the valve element toward the valve seat, a calibration spring carried by the housing for calibrating the pressure regulator to a predetermined regulation pressure and a device responsive to a predetermined temperature of the fuel in the regulator for changing the calibration of the pressure regulator from the predetermined regulation pressure to a second calibration pressure.

Accordingly, it is a primary object of the present invention to provide a fuel pressure regulator having a temperature responsive shape memory device which avoids problems associated with high fuel temperatures, facilitates a hot restart of the engine and alters the calibration pressure when the temperature of the fuel lies at or above a predetermined temperature.

BRIEF DESCRIPTION OF THE DRAWINGS

FIG. 1 is a schematic cross-sectional view of a fuel pressure regulator incorporating a fuel temperature responsive shape member device according to the present invention.

BEST MODE FOR CARRYING OUT THE INVENTION

Referring now to the drawing, there is illustrated a returnless fuel pressure regulator constructed in accordance with the present invention and generally designated 10. A fuel rail 12 which provides fuel to a plurality of fuel injectors 14 is likewise illustrated in communication with an outlet port 16 of the regulator 10 whereby fuel is supplied at a regulated pressure to the fuel injectors 14 for combustion in an internal combustion engine, not shown. On the inlet side of the regulator 10, fuel under high pressure is supplied to an inlet port 16 of regulator 10 from a fuel tank T via a conduit 18. Conduit 18 lies in communication with a pressure relief valve 20, in turn communicating with the fuel tank T via a pump P. The pressure relief valve 20, as set forth in U.S. Pat. No. 5,413,077, opens when the pressure between the outlet of the pump P and the inlet of the fuel pressure regulator 10 exceeds a pressure that is a predetermined amount higher than the regulation, i.e., calibration pressure provided by regulator 10.

The regulator 10 includes a housing 22 comprised of upper and lower cups 24 and 26, sealed one to the other about their open ends and encompassing a diaphragm assembly, generally designated 28. Diaphragm assembly 28 includes a diaphragm 30 and a central housing part 32. A generally annular cup-shaped disk 34 overlies the housing part 32 in a control chamber 36 in upper cup 24. A calibration spring 38 engages the disk 34 at one end and its opposite end engages the upper closed end of the upper cup 24. A nipple 40 is provided in cup 24 for connection to an engine manifold for obtaining manifold reference, as is well known.

The lower cup 26 includes a generally cylindrical neck 42 having an open bottom end forming the inlet port 16 which, as previously noted, lies in communication with the fuel in tank T via conduit 18. The upper end of the neck 42 has a central aperture 44 defining a valve seat 46 for a ball valve element 48. A spring 50 biases the ball valve element 48 towards the seat 46, the opposite end of the spring engaging the neck 42 about the fuel inlet port 16. The aperture 44, seat 46, element 48 and spring 50 thus form a ball check valve for regulator 10. The lower cup also defines a fuel chamber 27 on the opposite side of the diaphragm assembly 28 from the control chamber 36.

In accordance with the present invention, the central housing part 32 includes a downwardly opening recess 60, which houses a movable member or post 62. The post 62 is suitably retained in the recess 60 and is biased by a spring 64, preferably a helical coil spring. The spring 64 is formed of a shape memory alloy material, which alters its length and hence biasing force when the temperature of the fuel within regulator 10 reaches a predetermined temperature. For example, when the temperature of the fuel within the regulator increases to the predetermined temperature, the spring 64 elongates in response thereto and moves the member 62 downwardly to displace the ball valve element 48. Conversely, when the temperature of the fuel in the regulator is above the predetermined temperature and the spring has elongated, the spring will return to its original position when the temperature decreases to the predetermined temperature, relieving the additional force previously applied to the ball element 48.

In operation, the regulator 10 is calibrated such that a regulated pressure of fuel is supplied from the regulator to the fuel rail 12. Thus, the higher pressure fuel delivered from the fuel tank T by the pump P passes through the aperture 44 between the valve element 48 and valve seat 46. The post 62 maintains the valve element 48 displaced from the seat by the balance of pressure between the control chamber 36 and the fuel chamber 27. The regulator acts in the manner described in U.S. Pat. No. 5,413,077 to regulate the flow of fuel, the disclosure of which is incorporated herein by reference. Thus, upon increasing demand, the pressure in fuel chamber 27 decreases, causing the diaphragm assembly 28 to open the valve to a greater extent to admit additional fuel. Conversely, upon decreasing demand, the pressure in fuel chamber 27 increases, causing the diaphragm 30 to be displaced upwardly, reducing the flow opening through the valve.

The shape memory device, i.e., the preferred spring 64, maintains a substantially constant force on valve element 48 throughout the range of movement of the diaphragm assembly 28. It will be appreciated; however, that should the temperature of the fuel within the regulator increase above a predetermined temperature, an over-pressurization condition may occur which could result in a complete closure of the check valve. For example, during a hot soak when the engine is turned off and the temperature of the fuel in the fuel rail 12 increases, the pressure likewise increases to an over-pressurization condition where the diaphragm assembly 28 lifts and enables valve element 48 to close against seat 46. A vapor lock condition may also occur. To avoid this over-pressurization condition and deter a vapor lock condition and also to facilitate a hot restart, the shape memory spring 64 will extend to displace the post 62 and hence displace the valve element 48 engaged by post 62 in response to a predetermined temperature of the fuel in the regulator 10. Thus, during such hot soak, as the temperature of the fuel increases, the spring 64 will elongate and displace the post and valve element 48, for example, from a near or valve-closed position to a valve-open position whereby the pressure on both sides of the regulator is equalized to the system pressure. Consequently, cooler fuel is supplied to the fuel rail and the higher pressure of this supplied fuel helps prevent formation of vapor in the fuel rail, avoiding vapor lock. Essentially, the shape memory spring changes the calibration pressure during a hot fuel condition whereby at normal fuel temperatures, the regulator operates at its normal calibration pressure and at temperatures higher than the predetermined temperature the regulator operates at a higher calibration pressure. In the event the check valve closes during a hot fuel condition, the spring 64 operates to open the check valve and equalize the pressures on both sides of the regulator to the system pressure. This also enables admission of cooler fuel into the fuel rail thereby inhibiting conditions for forming vapor lock.

The shape memory device is preferably formed of a titanium alloy. The predetermined temperature may lie within a range, e.g., of 70–100° C. and preferably is about 80° C. The entirety of the elongation or shortening of the spring after elongation occurs at the predetermined temperature and is not a gradual elongation or shortening over a temperature range.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel pressure regulator comprising:

a housing;

a movable diaphragm dividing the housing into a fuel chamber and a control chamber;

said housing having a fuel inlet port for flowing pressurized fuel toward said fuel chamber and a fuel outlet port for flowing pressure regulated fuel from said housing;

a valve between said fuel inlet port and said fuel outlet port and including a valve seat, a valve element movable toward and away from said valve seat and a spring for biasing said valve element toward said valve seat;

said diaphragm including a member movable with and relative to said diaphragm toward and away from said valve element; and a device carried by said diaphragm engaging said member and formed of a temperature responsive shape memory material for displacing said valve element relative to said seat in response to a predetermined temperature of the fuel within the pressure regulator.

2. A pressure regulator according to claim 1 wherein said device comprises a spring carried by said diaphragm.

3. A pressure regulator according to claim 1 wherein said device comprises a helical coil spring carried by said diaphragm.

4. A pressure regulator according to claim 1 wherein said device is formed of a nickel and titanium alloy.

5. A pressure regulator according to claim 1 wherein said device and said member displace said valve element away from said valve seat in response to a rise in temperature of the fuel in the regulator to the predetermined temperature.

6. A pressure regulator according to claim 5 wherein said device and said member enable displacement of said valve element toward said seat in response to a lowering of the fuel temperature in the regulator from a temperature above said predetermined temperature to said predetermined temperature.

7. A pressure regulator according to claim 1 including a calibration spring carried by said housing for calibrating the pressure regulator to a predetermined regulation pressure, said device and said member being configured to displace said valve element in a direction away from said valve seat in response to said predetermined temperature, thereby changing the calibration of the pressure regulator from said predetermined regulation pressure to a second calibrated regulation pressure.

8. A pressure regulator according to claim 1 wherein said device comprises a helical coil spring carried by said diaphragm, said device being formed of a nickel and titanium alloy, said device and said member displacing said valve element in a direction away from said valve seat in response to a rise in temperature of the fuel in the regulator to the predetermined temperature and enabling displacement of said valve element toward said seat in response to a lowering of the fuel regulator from a temperature above said predetermined temperature to said predetermined temperature.

9. A fuel pressure regulator comprising:

a housing;

a movable diaphragm dividing the housing into a fuel chamber and a control chamber;

said housing having a fuel inlet port for flowing pressurized fuel toward said fuel chamber and a fuel outlet port for flowing pressure regulated fuel from said housing;

a valve between said fuel inlet port and said fuel outlet port and including a valve seat, a valve element movable toward and away from said valve seat and a spring for biasing said valve element toward said valve seat;

a calibration spring carried by said housing for calibrating the pressure regulator to a predetermined regulation pressure; and a device responsive to a predetermined temperature of the fuel in the regulator for changing the calibration of the pressure regulator from said predetermined regulation pressure to a second calibration pressure.

10. A pressure regulator according to claim 9 wherein said device increases the calibration pressure in response to a rise in the temperature of the fuel within said regulator to said predetermined temperature such that said second calibration pressure is greater than said predetermined calibration pressure.

11. A pressure regulator according to claim 7 wherein said device decreases the calibration pressure of said regulator from said second calibration pressure to said predetermined calibration pressure in response to a lowering of the fuel temperature in the regulator from a temperature above said predetermined temperature to said predetermined temperature.

* * * * *